May 12, 1953          H. A. STILSON          2,637,932
ANIMAL TRAP
Filed May 20, 1950          2 Sheets-Sheet 1
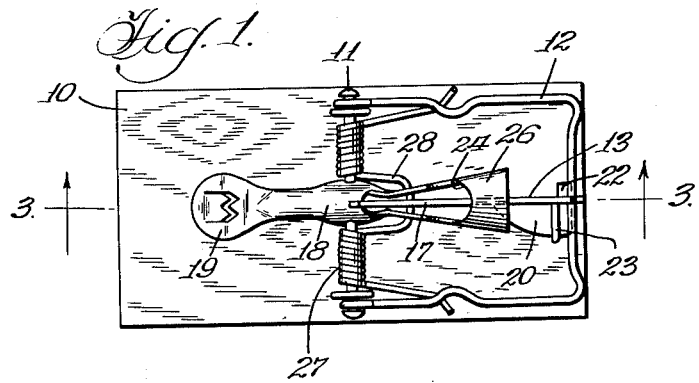
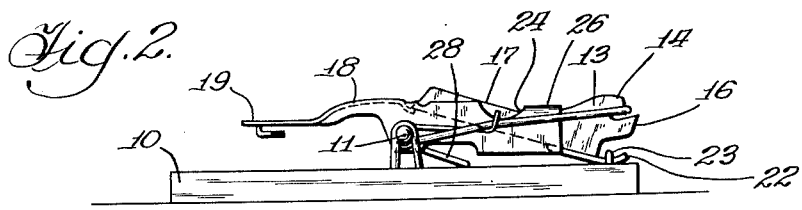
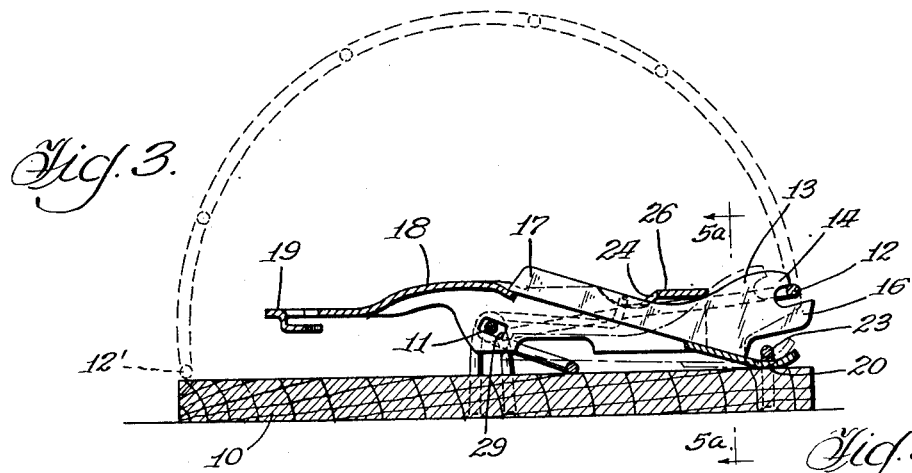
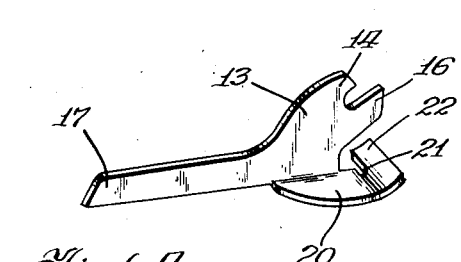
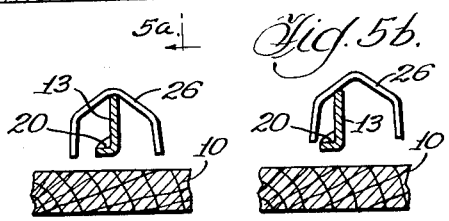
INVENTOR.
Herbert A. Stilson
BY
Toomer L. Muell
Atty.

May 12, 1953    H. A. STILSON    2,637,932
ANIMAL TRAP
Filed May 20, 1950    2 Sheets-Sheet 2
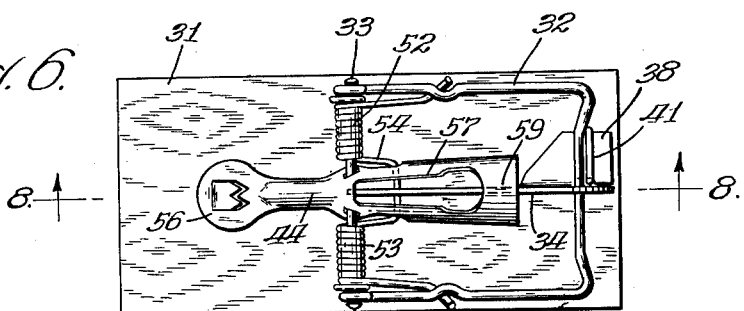
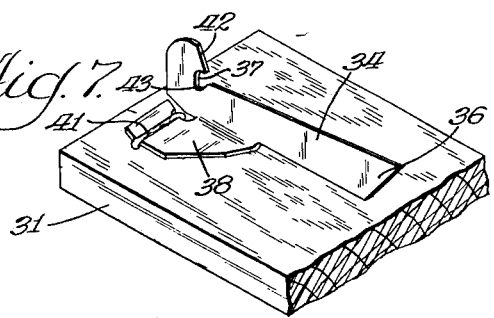
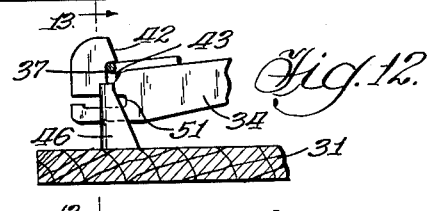
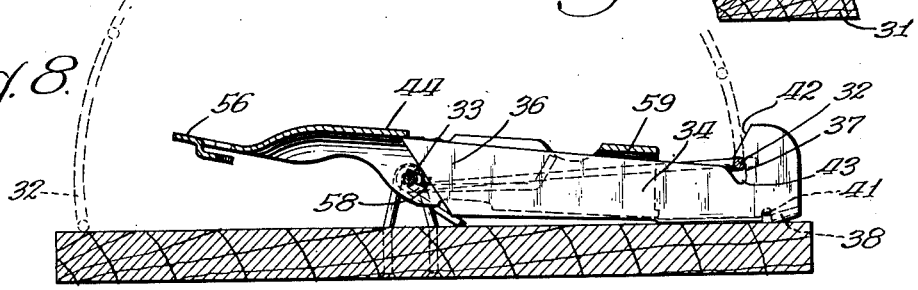
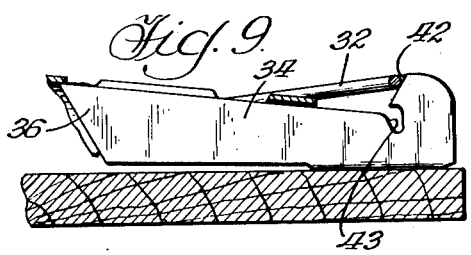
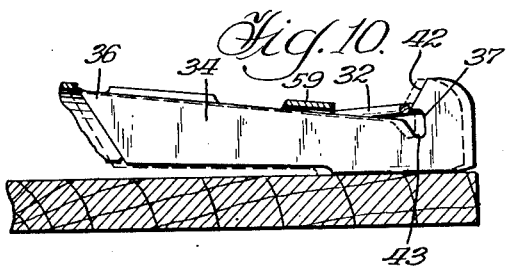
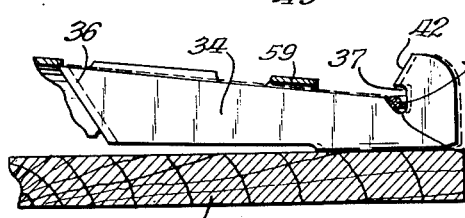
INVENTOR.
Herbert A. Stilson
BY
Foorman L. Mueller
Atty.

Patented May 12, 1953

2,637,932

UNITED STATES PATENT OFFICE 2,637,932

ANIMAL TRAP

Herbert A. Stilson, Chicago, Ill., assignor to McGill Metal Products Company, Marengo, Ill., a corporation of Illinois Application May 20, 1950, Serial No. 163,284

5 Claims. (Cl. 43—83.5)

The present invention relates to animal traps.

More particularly, the invention relates to automatic setting traps of the type generally employed for trapping mice and rats.

In automatic setting animal traps of the type utilizing a flat, sheet metal latching member that is vertically disposed with relation to the trap base, trouble has been experienced in mounting the member on the base. It is essential that the member be free to move quickly in order to assure proper operation of the trap. Should the latching member twist or slant, the operation of the trap would be impaired. Past efforts to assure that the latching member remain properly disposed, necessitated the use of rather elaborate guide structures mounted on the base. These structures not only made the trap more complicated than necessary, but ran up its cost as well. In addition, traps built in this manner were more subject to deformation during handling and shipping, due to the fact that the flat latching member could be more easily bent. Further, the setting action of the known traps of this type is more involved than necessary, requiring the movement of two or more members, in addition, of course, to that of the trap striker.

It is therefore one object of the present invention to provide an improved latching member for the automatic setting mechanism of an animal trap, which will assure proper operation of the setting mechanism.

Another object of the invention is to provide an improved automatic setting animal trap latching member construction which simplifies the manufacture of such traps, and reduces their overall cost.

A further object of the invention is to provide an improved latching member for an automatic setting animal trap wherein the possibility of its bending or deformation during shipping or handling, is reduced.

A still further object of the invention is to provide an automatic setting mechanism for an animal trap, having a more simple and easier setting action than known traps of the same type.

A feature of the invention is the provision of a flat latching member for the automatic setting mechanism of an animal trap, that is vertically disposed with relation to the trap base, and is mounted on the base by means of a broad tongue which forms substantially a right angle with the body of the latching member.

Another feature of the invention is the provision of a novel setting mechanism for an automatic setting animal trap, having a tongue mounted latching member for releasably engaging the trap striker that is adapted to be linearly moved in the automatic setting operation.

Other objects, features and many of the attendant advantages of this invention will be appreciated readily as the same becomes understood by reference to the following detailed description, when considered in connection with the accompanying drawings, wherein:

Fig. 1 is a top elevational view of an animal trap incorporating the improved striker setting mechanism;

Fig. 2 is a side elevation view of the trap shown in Fig. 1, in the set position;

Fig. 3 is a sectional view of the trap illustrated in Fig. 1, and showing in more detail the construction and operation of the trap setting mechanism;

Fig. 4 is a perspective view of the latching member included in the trap setting mechanism, comprising a part of the present invention;

Fig. 5a is a cross sectional view of the trap setting mechanism taken through plane 5—5 of Fig. 3, and showing the movable trigger means of that mechanism in one of its operative positions;

Fig. 5b is a cross sectional view of the trap setting mechanism, showing the movable trigger means in a second of its operative positions;

Fig. 6 is a top elevational view of an animal trap utilizing a novel, linear movable trap setting mechanism comprising a part of the invention, and showing the trap in its set position;

Fig. 7 is a perspective view of a novel latching member comprising a part of the invention;

Fig. 8 is a sectional view of the trap taken through plane 8—8 of Fig. 6, showing the construction of the trap setting mechanism;

Fig. 9 is a fragmentary sectional view of the setting mechanism showing one phase of its setting operation;

Fig. 10 is a fragmentary sectional view of the setting mechanism showing the position of the latching member during the latter part of the phase of its operation depicted in Fig. 9;

Fig. 11 is a fragmentary sectional view of the setting mechanism showing a second phase of its setting operation;

Fig. 12 is a fragmentary side view of an alternative mounting construction for the latching member; and Fig. 13 is a fragmentary end view of the latching member support shown in Fig. 12.

In practicing the invention a spring biased jaw or striker for hitting and catching the animal, is pivotally mounted on a trap base, preferably of wood. The striker or jaw is releasably retained in the set condition by a flat latching member having a detent shoulder portion on one of its ends for releasably engaging the trap striker, and the other end detachably engaging a trigger means actuated by the trap bait treadle. The latching member is vertically disposed with relation to the base and has its first mentioned end pivotally supported on the base by means of a broad integral extension or tongue forming substantially a right angle with the body of the member. The tongue is pivotally attached to the base by means of a staple or the like so as to allow longitudinal pivotal movement of the latching member, and provides a stable support which prevents twisting or slanting of the latching member. In one embodiment of the invention, the tongue is longitudinally slit so as to allow a novel longitudinal sliding or linear movement of the latching member during the automatic setting operation. The linear sliding movement of the latching member is automatically provided upon the trap striker sequentially engaging a pair of cam surfaces, one of which is spaced above the other. The cam surfaces are formed on the upper edge of the latching member with the detent shoulder portion therebetween. The upper cam surface is so shaped, that upon being engaged by the trap striker, the latching member is linearly moved to a position in which the detent shoulder is out of the line of travel of the striker. The lower cam surface is shaped so that the latching member is linearly moved to a position placing the detent shoulder in the line of travel of the striker, and the trigger engaging end adjacent the trigger. This effects automatic setting of the trap through linear movement of the latching member only.

Referring now to Figs. 1 and 2, the invention includes a base 10, preferably of wood, supporting a crosspin 11 upon which a spring actuated jaw or striker 12 is pivotally mounted.

Adverting next to Fig. 3, striker 12 is releasably retained in the set position as shown, by an automatic setting mechanism including a flat latching member 13 having an upper, detent shoulder portion 14 and a lower, setting shoulder portion 16 formed in one end thereof, with the lower setting shoulder extending further from said latching member than said upper detent shoulder. The remaining end of latching member 13 is elongated to form an extension arm 17 that is detachably seated on a U-shaped lever or trigger means 18 actuated by an integral bait treadle 19. As is best seen in Figs. 3 and 4, latching member 13 is pivotally mounted on base 10 by means of a broad, integral extension or tongue 20 formed on the end thereof adjacent shoulder portions 14 and 16. Tongue 20 forms substantially a right angle with the body of latching member 13, and extends both longitudinally and laterally away from the body of said latching member. The longitudinally extended portion of tongue 20 has a notch 21 formed therein terminating in a laterally broadened, outermost portion 22 that is curved upwardly. While this particular configuration has been shown and described, it is to be understood that the exact configuration of tongue 20 is of no import other than that it provides a broad, stable, pivotal support for latching member 13 which acts both as a means for preventing twisting or slanting of the latching member, as well as to allow easy longitudinal pivotal movement of that member. In addition, tongue 20 serves to strengthen latching member 13 so as to prevent deformation of the same during shipping and handling.

Referring again to Fig. 3, tongue 20 is pivotally secured to base 10 by means of staple 23 having one leg projecting through notch 21, and straddling the narrowed neck portion formed in tongue 20 by said notch. The securing of latching member 13 to base 10 in this manner greatly facilitates the final assembly of the trap, as well as reducing the overall cost thereof. Final assembly is facilitated due to the fact that staple 23 can be secured to the base along with the mounting staples for striker 12, hooking tongue 20 to the staple thereafter requires only a simple one step operation. This results in decreasing the cost of the trap in addition to the savings effected through the use of a relatively cheap staple for attaching the latching member to the base, in the place of a more elaborate securing means.

Staple 23 is located on base 10 so that the pivot point of latching member 13 is positioned closer to the center of rotation of striker 12 than that part of detent shoulder portion 14 which engages the striker. Thus, upon pivoting striker 12 rearwardly from the position shown in dotted lines of Fig. 3, it engages setting shoulder portion 16, forcing that portion downwardly and causing extension arm 17 to pivot upwardly through an elongated aperture 24 in the vertex or cowling portion 26 of U-shaped trigger means 18. It is of utmost importance that arm 17 be properly aligned with trigger means 18 at the point of its uppermost travel, so at this instant, broadened portion 22 engages the surface of base 10 to further prevent twisting and slanting of the latching member, thereby further assuring that the same seats properly in an indentation formed in trigger lever 18.

During its upward movement, extension arm 17 momentarily engages cowling portion 26, flipping that end of trigger means 18 upwardly and allowing the extreme end of extension arm 17 to raise above the aforementioned indented seat in trigger means 18. Thereafter, trigger means 18 pivots back to its idle position due to the fact that the end thereof on which cowling portion 26 is situated, overbalances bait treadle 19. Upon releasing striker 12, it thereafter engages upper detent shoulder 14, tending to force extension arm 17 downwardly, and seating the end of said extension arm in the seat formed in trigger means 18. This results in automatically setting the trap.

Should a mouse or a rat, in going after the bait on treadle 19, force the said treadle downwardly, extension arm 17 is released from the seat in trigger means 18, and pivots downwardly. The pivotal movement of latching member 13 results in releasing striker 12 to the action of a coil spring 27 having a pair of spirally wound sections backed by an integral, center looped portion 28 acting against base 10, and allows striker 12 to be pivoted forwardly in the striking movement. Should the rat or mouse attack the bait treadle from the side, trigger means 18 is pivoted sidewardly, due to the freedom from movement in this plane allowed by a pair of rearwardly and downwardly extending, elongated slots 29 (best seen in Fig. 3) formed in the sides of said U-shaped trigger means, and allowing trigger means 18 to move from its center position shown in Fig. 5a, to a displaced position shown in Fig. 5b. Due to the shape of cowling portion 26, this movement causes the end of trigger means 18 adjacent the pivot point of latching member 13 to ride upwardly, forcing bait treadle 19 downwardly, and unseating extension arm 17 in the above described manner.

Upon being released from its seat, extension arm 17 is free to pivot downwardly, due to its own weight, and the flipping action of striker 12 acting against detent shoulder 14. Binding of this movement due to twisting or slanting of the latching member, is prevented by the broad and stable pivotal support provided by tongue 20. Due to the fact that there is a minimum contact surface between staple 23 and tongue 20, freedom for movement between those two elements of the setting mechanism is assured.

Referring next to Fig. 6, another embodiment of an automatic setting animal trap is shown, which utilizes the novel latching member construction in a novel automatic setting mechanism comprising a part of the invention. The trap includes a base 31 having a spring actuated striker 32 pivotally mounted thereon by means of a crosspin 33. Striker 32 is retained in the set position shown in Fig. 6, by an automatic setting mechanism including a latching member 34.

Referring now to Fig. 7, latching member 34 comprises a flat sheet metal body having one end thereof elongated to form an extension arm 36, and a detent shoulder portion 37 formed on the other end thereof. Latching member 34 is vertically disposed with relation to base 31, and is mounted on base 31 by a tongue 38 comprising an integral, broad extension formed on the end thereof adjacent detent shoulder portion 37. Tongue 38 forms substantially a right angle with the body of latching member 34, and is secured to base 31 by means of an elongated notch cut in the portion thereof adjacent the body of latching member 34 and a staple 41. Tongue 38 is easily attached to staple 41 in a simple one step assembling operation, and results in a substantial savings as previously pointed out.

Staple 41 loosely holds latching member 34 in position, and, due to the elongated construction of the notch in which it is seated, allows linear or longitudinal sliding movement of the latching member, as well as longitudinal pivotal movement thereof. Linear sliding movement of latching member 34 is provided by a first or upper cam surface 42, and a second or lower cam surface 43, formed on the upper edge above and below detent shoulder portion 37, respectively. As is best shown in Fig. 9, upper cam surface 42 normally lies in the path travelled by striker 32, upon the striker being pivoted rearwardly from its released position shown in dotted lines in Fig. 8. Cam surface 42 is sloped downwardly and towards extension arm 36 or the fulcrum of striker 32, so that upon the striker engaging said cam surface, latching member 34 is linearly moved rearwardly to the position shown in Fig. 10. Further downward travel of striker 32, causes the striker to come into engagement with lower cam surface 43. Cam surface 43 is sloped downwardly and away from extension arm 36 or the fulcrum of striker 32, so that the latching member 34 is driven forwardly in a straight-line movement from its rearmost position shown in Fig. 10, to its setting position shown in Fig. 8, in the manner illustrated in Fig. 11. As the result of its forward motion, detent shoulder portion 37 is positioned in the line of travel of striker 32, and extension arm 36 is positioned to engage the underportion of a trigger 44 comprising a U-shaped sheet metal member which is pivotally mounted on crosspin 33. This results in automatically positioning the latching member to engage striker 32. Thereafter, upon letting go of striker 32, it engages detent shoulder portion 37 at a point closer to the fulcrum of said striker than the line upon which rivet 41 fulcrums latching member 34, tending to pivot detent shoulder portion 37 upwardly, and pivoting the end of extension arm 36 into engagement with trigger 18; thereby automatically setting the trap. To assure this action, the notch seating staple 41 is cut sufficiently deep longitudinally so that the sides thereof engaged by staple 41 when latching member 34 is in its rearmost position, provides sufficient room for striker 32 to clear detent shoulder portion 37. Thus, an automatic linear setting movement of the trap setting mechanism is provided, which requires that only the latching member be moved during the setting operation, in addition, of course, to the trap striker. This greatly simplifies the setting operation resulting in an easier setting action. Further, the configuration and construction of the latching member of the novel setting mechanism is such that the possibility of deformation of protruding portions is reduced to a minimum; thereby resulting in fewer rejects due to damage during handling and shipping. This feature of the novel setting mechanism is further enhanced, in the preferred embodiment, by the broad tongue 38 which prevents bending latching member 34, and greatly simplifies the attachment of the latching member to the base.

Adverting now to Fig. 12, an alternative manner of mounting latching member 34 is disclosed. In this modification of the novel setting mechanism, latching member 34 is physically disposed in relation to base 31, striker 32 and trigger member 44 in precisely the same fashion as in the trap shown in Fig. 6. However, as is best shown in Fig. 12, it differs from the embodiment of Fig. 6, in that latching member 34 is mounted on a U-shaped channel member 46 having slots cut in the center portion thereof. Channel member 46 is secured to base 31 in a position thereon substantially on the longitudinal center line of the base and slightly to the rear of the line of travel of the trap striker, and, as is best shown in Fig. 13, has an upper notch 47 and a lower slot 48 vertically aligned with notch 47, cut therein, and forming a crossbar 49. Latching member 34 is attached to crossbar 49 by means of an elongated notch 51 formed in its rearward edge, and best seen in Fig. 12. Notch 51 is slidably fitted over crossbar 49, and forms a means for both slidably and pivotally mounting latching member 34 on base 31. As the operation of this embodiment of the novel setting mechanism would be no different from that shown in Fig. 6, it is felt that a discussion of its operation is not necessary.

In order to set the trap shown in Fig. 6, striker 32 is pivoted rearwardly from its forward position shown in dotted lines in Fig. 8, against the action of a strong coil spring comprising two spirally wound sections 52 and 53 mounted on crosspin 33, and joined together by an integral, looped center portion 54 which is backed by base 31. Upon striker 32 reaching the position shown in Fig. 9, it engages upper cam surface 42 to drive latching member 34 rearwardly to the position shown in Fig. 10, and continues to move downwardly past detent shoulder portion 37. Upon engaging lower cam surface 43, striker 32 draws the latching member forwardly, positioning the detent shoulder portion in the line of travel of the said striker, and the end of extension arm 36 under trigger 44. Upon releasing the pressure from striker 32, the striker is moved upwardly, engaging detent shoulder portion 37, and pivoting the end of extension arm 36 upwardly into engagement with trigger 44, thereby automatically setting the trap. Should an animal thereafter force a bait treadle 56 integral with trigger means 44, downwardly, the end of extension arm 36 is released, and is pivoted upwardly through an elongated aperture 57, best shown in Fig. 6, formed in U-shaped trigger 44; thereby releasing striker 32 from detent shoulder portion 37. Should the bait treadle 56 be attacked from the side, trigger 44 is allowed to pivot sidewardly due to the construction of a pair of apertures 58 in the sides of U-shaped trigger 44, swinging a cowling portion 59 of trigger 44 adjacent detent shoulder portion 37 of latching member 34, sidewardly. Due to the construction of cowling portion 59, the cross section of which is similar to that shown in Figs. 5a and 5b, that end of trigger 44 is caused to move upwardly, pivoting bait treadle 56 downwardly, and releasing latching member 34 in the above described manner. Thus, the invention provides a latching member having a novel supporting means or tongue thereon, for use in the setting mechanism of an automatic setting animal trap. This tongue allows quick and easy action of the latching member, and prevents binding thereof due to twisting or slanting of the same. Further, the construction of a trap incorporating a tongue-mounted latching member is greatly simplified, which, in addition to savings effected through use of relatively cheap components, results in lowering the cost of the trap operation. Additionally, mounting of the latching member by means of a tongue makes practicable the use of a novel setting mechanism wherein the latching member is linearly movable, and requires only the movement of that member during the setting operation. This results in greatly simplifying the setting operation, and renders the trap more easily operated. Lastly, the tongue structurally strengthens the latching member, making it less likely to be deformed during shipping and handling.

Other modifications and variations of the invention will suggest themselves to those skilled in the art in the light of the above teachings. It is therefore to be understood that such changes are within the full intended scope of the invention as defined in the appended claims.

I claim:

1. An animal trap including in combination a base, a spring actuated striker pivotally mounted on said base, and a striker setting mechanism for releasably retaining said striker in the set position, said mechanism including a trigger mounted on said base and having a bait treadle thereon, and a flat, vertically disposed latching member releasably engaging said striker and having a broad integral tongue on one end thereof, a staple secured to said base, said tongue being pivotally attached to said base beneath said staple with the broad surface thereof rockably engaging the surface of said base, and said latching member having the remaining end thereof supported by said trigger to retain said striker in the set position and disengageable from said trigger upon said bait treadle being actuated to release said striker.

2. In an automatic animal trap having a wood base, a spring loaded striker pivotally mounted on said base, and a centrally pivoted trigger lever having a bait treadle on one arm thereof and a longitudinal aperture in the remaining arm thereof, the improvement including a flat latching member releasably engaging said striker and being vertically disposed with relation to said base, one end of said latching member being disengageably supported by said trigger lever arm having the aperture therein and being movable in said aperture, and the remaining end of said latching member having an integral, broad extension thereof forming a right angle with the body of said member, and a staple secured to said base, said extension being pivotally attached to said base beneath said staple with the broad surface thereof pivotally engaging the surface of said base thereby allowing longitudinal pivotal movement of said latching member.

3. In an animal trap having a base and a spring actuated striker, the combination including a latch for releasably retaining the striker in set position and a two-legged staple secured in the base, said latch comprising an extension arm having a notched portion at the rear thereof and a curved tongue integral with the extension arm at the rear and extending laterally therefrom, said tongue having a notch at one side thereof, said latch being assembled to the base with its tongue beneath said staple and with one leg of the staple passing through the tongue notch, said latch being attached solely by the staple above the curved tongue for a limited movement with the underside of the curved tongue engaging said base.

4. In an animal trap having a base and a spring actuated striker, the combination including a latch for releasably retaining the striker in set position comprising an extension arm having a notched portion at the rear thereof and a tongue integral with the extension arm at the rear and extending laterally therefrom, said tongue having a notch therein and being of a curved configuration, and a staple in the trap base, said latch being adapted to be assembled to the base with the tongue loosely held beneath said staple to thereby movably support said latch on said base at the notched and curved portion of said tongue by engagement at said notch with said staple and the underside of the curved portion of the tongue in engagement with the base beneath said staple.

5. In an animal trap having a base and a spring actuated striker, the combination including a latch for releasably retaining the striker in set position and a two-legged staple secured in the base, said latch comprising an extension arm having a notched portion at the rear thereof and a curved tongue integral with the extension arm at the rear and extending laterally therefrom, said tongue having a notch at one side thereof, said latch being assembled to the base with its tongue loosely held beneath said staple and with one leg of the staple passing through the tongue notch, said latch being attached solely by the staple above the curved tongue for a pivotal movement with the underside of the curved tongue rockably engaging said base.

HERBERT A. STILSON.

References Cited in the file of this patent

UNITED STATES PATENTS

| Number | Name | Date |
| --- | --- | --- |
| 2,376,591 | Hammond | May 22, 1945 |